March 3, 1931.  C. G. OLSON  1,795,093
THREAD MILLING CUTTER
Filed Aug. 29, 1927  2 Sheets-Sheet 1
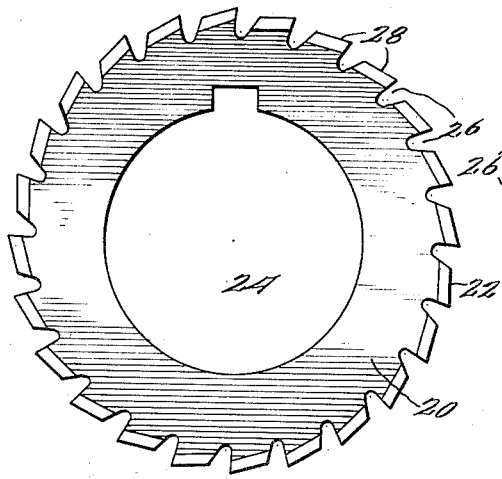
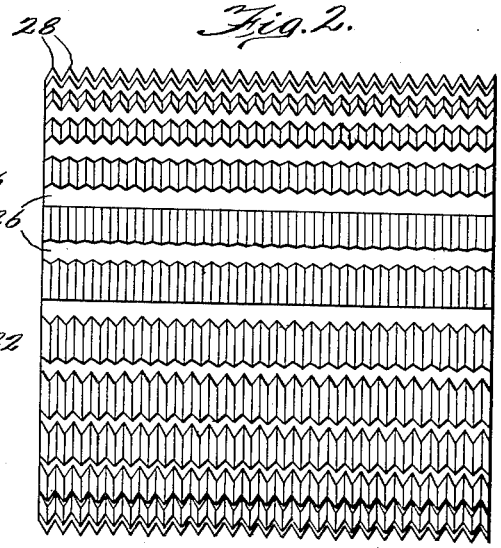
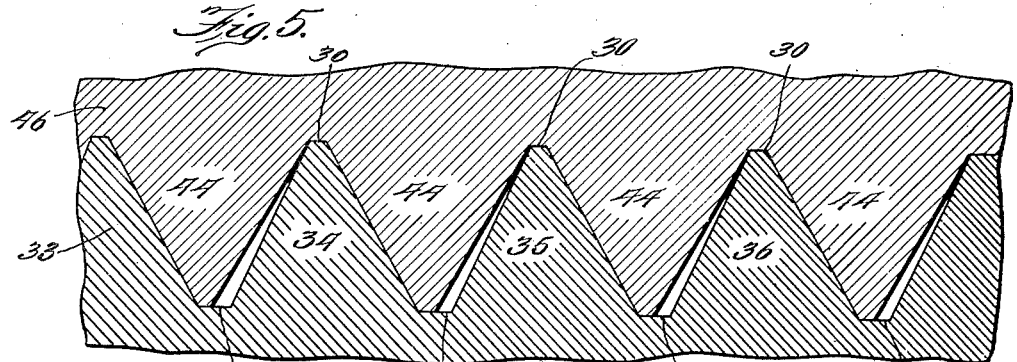
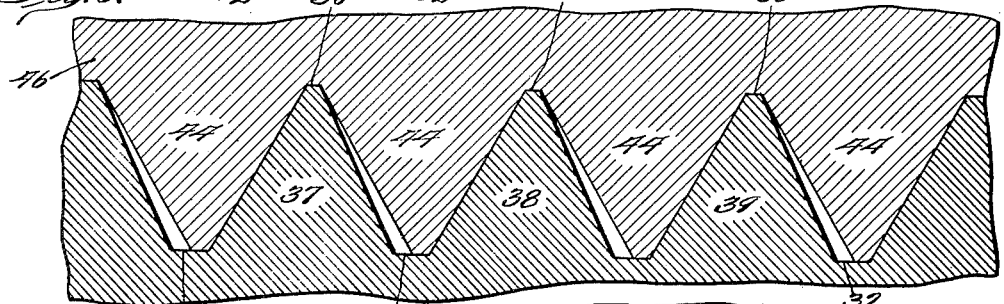
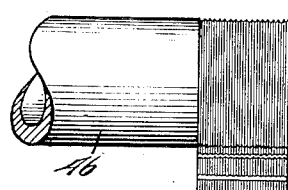
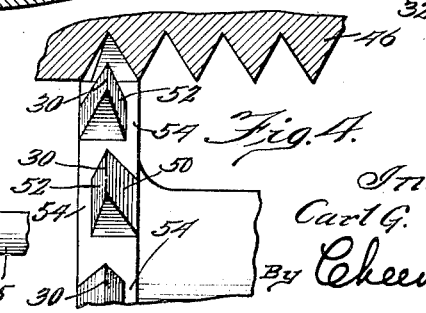
Inventor:
Carl G. Olson
By Cheever & Cox
attys Patented Mar. 3, 1931

1,795,093

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

THREAD-MILLING CUTTER

Application filed August 29, 1927. Serial No. 216,224.

My invention relates to thread milling cutters commonly called thread milling "hobs", and the principal object of the invention is to provide a hob which will make a cleaner cut than heretofore, thus reducing the amount of friction and producing a smoother thread. The milling of threads has been considered difficult, particularly in the softer metals and wrought iron pipe. In the latter the texture of the metal is affected by the process by which the pipe is made, and often the grain runs lengthwise to a degree which is quite noticeable. In cutting thread on a pipe, the cutting takes place across this grain and this often adds to the difficulty of producing a smooth thread. Furthermore in using some thread cutters the metal is forced forward by the teeth with what amounts practically to a tearing action, and this of course tends to produce a rough thread. Furthermore in some thread cutters the chips become jammed ahead of the cutting teeth, thus tending still further to mar the thread and generate heat on account of the undue amount of friction present. These difficulties have been largely overcome by the use of my improved cutter and in addition the life of the cutter has been prolonged and its capacity for producing work increased.

This has been accomplished in my cutter by forming the cutter teeth with a lesser angle on one side than the angle of the thread to be cut, thus producing a cutter tooth which has a cutting side and a non-cutting side It is not new to stagger the teeth in certain types of thread milling cutters for the purpose of reducing the cutting resistance and producing smooth work, but one of the peculiarities of my hob is that the points of the teeth are always in line with each other, although the tooth cuts at one side only and at the top. In other words, in my hob the teeth are not staggered at the top, although one side of each tooth is of a reduced angle thereby relieving it of the necessity or ability to take a cut. In other words, in my cutter the points of the teeth are always in line with each other circumferentially, but the teeth are oblique triangles in cross section, one side (which is the non-cutting side) being steeper than the other, which is the cutting side.

While sharp V threads are sometimes called for, it is the more common practice to produce small "flats" at the top and bottom of the thread, and when I refer to the "point" of the cutter teeth I refer to the outer extremity, whether the same be sharply pointed or terminate in a flat, in accordance with the formula for the U. S. standard and other standard threads.

To explain the invention more in detail reference may be had to the accompanying drawings in which—

Figure 1 is an end view of a cutter embodying my invention.

Figure 2 is a side or face view of the cutter.

Figure 3 is a small scale view showing the position of the tool relative to the work and illustrating the fact that in practice the hob is presented to the work with its axis parallel to the work axis and that the hob is of the full length of the thread, thus causing it to produce a complete thread at a single setting.

Figure 4 is a view largely diagrammatic illustrating the general proposition that in my cutter the points of the teeth are always in line with each other, but that the sides of a given tooth have different slopes so that one side will take no cut.

Figures 5 and 6 are fragmentary sectional views of the teeth and of the work drawn to an enlarged scale and illustrating the fact that one side of each tooth is steeper, i. e. is at a smaller angle than the thread angle, thus taking no cut; while the opposite side has the same slope as the thread angle and is therefore the cutting side. This figure illustrates also the fact that the points of the teeth are always in line with each other and the fact that all of the teeth cut at the point as well as along one side.

Figure 7:
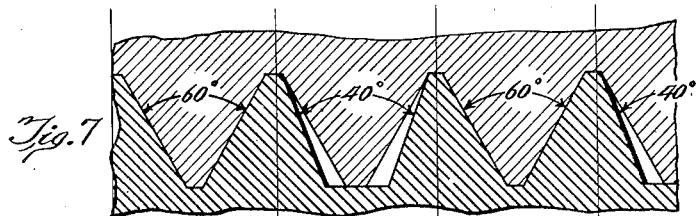
Figure 8:
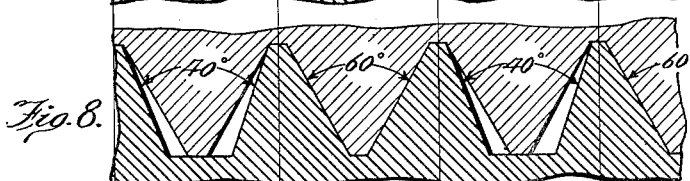
Figure 9:
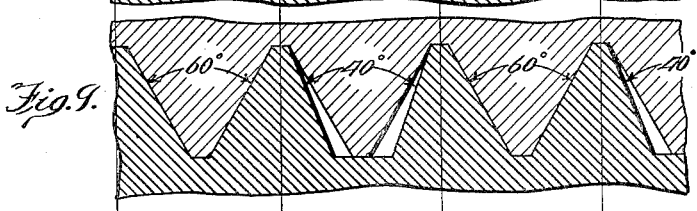

Figures 7, 8 and 9 are sectional views of a portion of one form of cutter embodying my invention. In this form the teeth in any given ring alternate, one cutting at the right, the succeeding one cutting at the left, the next at the right, and so on. In this form the teeth of a given longitudinal row, i. e. a row parallel to the cutter axis, also alternate in the sense that one tooth in the row cuts at its left side, the next cuts at its right, the next at its left, and so on. Thus it may be said that in Figures 7, 8 and 9 which represent successive rows of the same milling cutter, the teeth are arranged alternately in rings and in rows.

Figure 10:
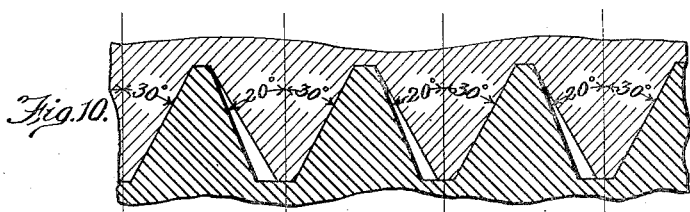
Figure 11:
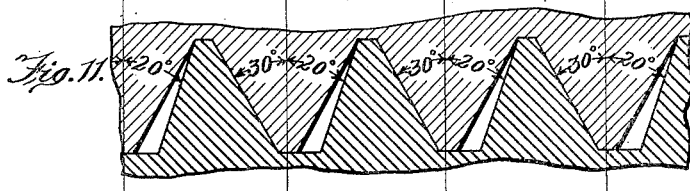
Figure 12:
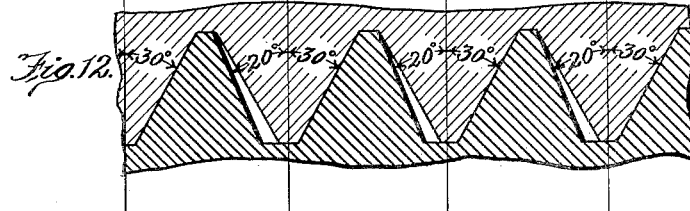

In Figures 10, 11 and 12 the teeth alternate in a given ring but do not alternate in a given row.

Figure 13:
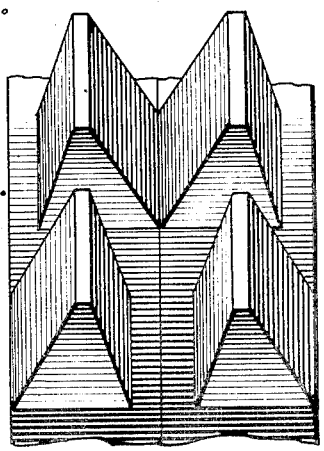
Figure 14:
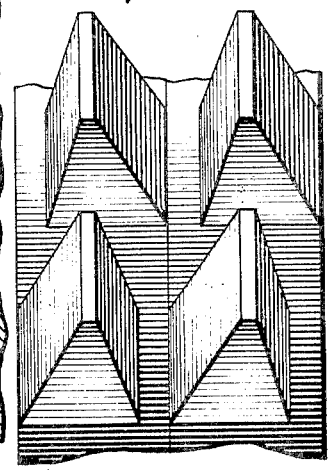

Figure 13 is a fragmentary perspective illustrating with sharper teeth the principle of construction in the arrangement shown in Figures 7, 8 and 9; while Figure 14 is a fragmentary perspective illustrating with sharper teeth the principle of construction in the arrangement shown in Figures 10, 11 and 12.

Figure 15:
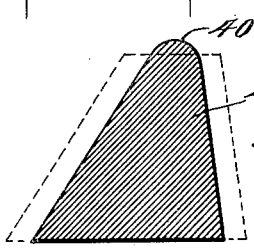

Figure 15 shows the cross section of an individual tooth which may be employed in my cutter to produce the so-called Whitworth thread.

Like numerals denote like parts throughout the several views.

As best shown in Figure 1, the cutter body 20 has a plurality of teeth 22 which are relieved at the top in the ordinary manner. In Figure 2 it will be evident that the teeth are arranged in rings at right angles to the axis. The tool is therefore strictly speaking a "ring" milling cutter, although trade usage has made it customary to refer to cutters of this general type as thread milling "hobs."

These cutters may of course have a central bore 24 as shown in Figure 1, or they may be on solid shanks 25 as illustrated in Figure 3. The cutter may be straight or helically fluted or gashed, the present hob as shown in Figure 2 having straight gashes 26; that is gashes parallel to the axis.

The new cutter may have either sharp pointed teeth 28 as illustrated in Figures 2, 4, 13 and 14 or they may have "flats" 30 and 32 at the top and the bottom respectively, as shown in Figures 5 to 12 inclusive, or they may have rounded tops 40 as shown on the tooth 42 in Figure 15 used for producing Whitworth threads.

In Figures 5 to 12 the cutter teeth are assumed to be upstanding and coming toward the observer. Thus in Figure 5 the teeth are indicated at 33, 34, 35 and 36, while in Figure 6 they are represented by 37, 38 and 39. The interprojecting parts 44 represent the thread which is being produced on the work 46.

In Figure 4 the general theory of construction is shown in a single circumferential row of teeth, i. e. in a single ring. This figure is used for illustrative purposes only, for it will be understood that in modern practice cutters of multiple rings are employed, the purpose being to save time so that the thread can be completed in a single complete rotation of the work. This Figure 4 shows, however, that in a single ring the tops 30 of the teeth are all in line with each other circumferentially but that whereas the cutting sides 50 are of the same pitch or slope as the thread to be cut (usually 30 degrees), the opposite side 52 is steeper; that is, is at a smaller angle relatively to a plane perpendicular to the axis. This may be referred to as the cut away or the "relieved" side, and of course is the non-cutting side of the tooth.

At the base of the non-cutting side there is of course left a "flat" 54. It would seem proper therefore to characterize this cutter as having teeth which in a given ring are staggered at the body portion but are in alignment at the points.

While the cutter teeth in any single ring have staggered or alternately offset bodies as just explained, the arrangement so far as any given longitudinal row is concerned may be varied by employing either the arrangement shown in Figures 7 to 9 and 13 or the arrangement shown in Figures 10 to 12 and 14.

It may be said that in the arrangement shown in Figure 13 the cutting sides of two adjacent teeth face each other and the non-cutting teeth of two adjacent teeth face each other, while in Figure 14 it may be said that a cutting side always faces the non-cutting side. In other words, the bodies of the teeth will alternate in a given circumferential row, but may be either alternate or be symmetrically in a given longitudinal row.

In practice the cutter is held with its axis parallel to the work axis. In the milling of threads the angle of the sides of the thread and the sweep of the cutting teeth are such that there is no interference as the teeth of the cutter sweep through the work. This effect is usually enhanced by making the milling cutter of smaller diameter than the work. In action the cutter will rotate at relatively high speed and the work will rotate at slow speed, and there will be relative axial movement, equal, when single thread work is being produced, to one thread spacing for one single complete rotation of the work. This is in accordance with standard practice for thread cutting by tools of this class.

It will also be understood that a slight taper may be imparted to the cutter considering the body as a whole, in order to produce a corresponding taper on the work to accord with standard pipe threading practice.

Having thus described my invention what I claim as new and desire to secure as Letters Patent is:—

1. A milling cutter having teeth whose outer extremities are uniform in size and in line circumferentially and whose bodies are staggered, each tooth thereby having a cutting side and a side which is substantially non-cutting during the operative engagement of the cutter with the work and all teeth cutting at the top.

2. A thread milling cutter having teeth arranged in circumferential and longitudinal rows, the outer ends of the teeth in a given circumferential row being uniform in size and positioned in line with each other and each tooth having a cutting side and a side which is relieved to render the same substantially non-cutting during the operative engagement of the cutter with the work, the teeth of a given circumferential row being arranged alternately whereby each succeeding tooth cuts at its opposite side.

3. A thread milling cutter having teeth arranged in circumferential and longitudinal rows, the outer ends of the teeth in a given circumferential row being uniform in size and positioned in line with each other and each tooth having a cutting side and a side which is relieved to render the same substantially non-cutting during the operative engagement of the cutter with the work, the teeth of a given circumferential row being arranged alternately whereby each succeeding tooth cuts at its opposite side and the teeth of a given longitudinal row being arranged alternately whereby a relieved side faces a relieved side and a cutting side faces a cutting side.

4. A thread milling cutter having teeth arranged in a plurality of rows substantially at right angles thereto, the points of the teeth having narrow flats, the entire flat portion of the teeth in a given ring being of uniform width and positioned in alinement, circumferentially, whereby each tooth takes a cut entirely across the corresponding flat at the bottom of the thread to be cut, one side of each tooth being steeper than the side of the thread to be cut, whereby the steeper side is substantially non-cutting during the operative engagement of the cutter with the work, and the steeper sides occurring on alternate sides of successive teeth in a given ring.

5. A thread milling cutter having teeth arranged in a plurality of rings and a plurality of rows at substantially right angles thereto, the teeth having flats at the top, the flats in a given ring being of uniform width and in alinement circumferentially whereby each flat takes a cut clear across the corresponding flat produced at the bottom of the space between threads on the work, one side of each tooth being cut away whereby it fails to cut, and the teeth being arranged alternately in a given ring whereby the bodies of the teeth are staggered, and there being flats at the bottom of the spaces between two adjacent cutter teeth in a given row the latter flats being wider than the former and cutting along across a portion of their width.

6. A thread milling cutter having teeth arranged in circumferential and longitudinal rows, the outer ends of the teeth being flat, said flat portions being of uniform width and arranged in alinement in a circumferential row whereby the flat portion of each tooth in that row cuts clear across the bottom of the space between adjacent threads of the work, the alternate teeth in a given circumferential row being cut away at one side so that the same will have substantially no cutting engagement with the work and the intervening teeth in that row being likewise cut away at the opposite side so as not to cut, the acting sides of two adjacent teeth in a longitudinal row facing each other, and the cut away sides of two adjacent teeth in a given longitudinal row facing each other.

7. A thread milling cutter having teeth arranged in circumferential and longitudinal rows, the points of the teeth being flat, said flat portions being uniform in width and arranged in alinement in a circumferential row whereby the flat portion of each tooth in that row cuts clear across the bottom of the space between adjacent threads of the work, the alternate teeth in a given circumferential row being cut away at one side so that the same will have substantially no cutting engagement with the work and the intervening teeth in that row being likewise cut away at the opposite side so as not to cut, the acting sides of two adjacent teeth in a longitudinal row facing each other, and the cut away sides of two adjacent teeth in a given longitudinal row facing each other, there being flats at the bottom of the spaces between each pair of teeth in a given longitudinal row, the widths of the last mentioned flats being approximately twice as great as the flats at the points of the cutter teeth.

8. A milling cutter having teeth whose outer ends are uniform in width and in line circumferentially and whose bodies are staggered, each tooth thereby having a cutting side and a side formed with a slope of greater steepness than the cutting side, whereby said steeper side will be rendered substantially noncutting during the operative engagement of the cutter with the work.

9. A thread milling cutter having teeth arranged in circumferential and longitudinal rows, the outer ends of teeth in a given circumferential row being of uniform size and in line with each other and each tooth having a cutting side and a side having a slope of greater steepness than the slope of the cutting side so that said steeper side will have substantially no cutting engagement with the work, the teeth of a given circumferential row being arranged alternately whereby each succeeding tooth cuts at its opposite side.

10. A thread milling cutter having teeth arranged in circumferential and longitudinal rows, the outer ends of the teeth being uniform in width and arranged in alignment in a circumferential row so that said points completely traverse the bottom of the threads in the work, the alternate teeth in a given circumferential row being cut away at one side and the intervening teeth in that row being likewise cut away at the opposite side, the acting sides of two adjacent teeth in a longitudinal row facing each other and the cut away sides of two adjacent teeth in a given longitudinal row facing each other.

In witness whereof, I have hereunto subscribed my name.

CARL G. OLSON.